United States Patent [19]

Rettenmaier

[11] Patent Number: 5,028,266

[45] Date of Patent: Jul. 2, 1991

[54] FIBER-FILLED GRANULES

[76] Inventor: Stephan Rettenmaier, Ulmenweg 2, 4790 Paderborn, Fed. Rep. of Germany

[21] Appl. No.: 294,488

[22] PCT Filed: Apr. 19, 1988

[86] PCT No.: PCT/EP88/00328

§ 371 Date: Dec. 29, 1988

§ 102(e) Date: Dec. 29, 1988

[87] PCT Pub. No.: WO88/08438

PCT Pub. Date: Nov. 3, 1988

[30] Foreign Application Priority Data

May 1, 1987 [DE] Fed. Rep. of Germany ....... 3714620
May 5, 1987 [DE] Fed. Rep. of Germany ....... 3714828

[51] Int. Cl.$^5$ ............................................. C08L 95/00
[52] U.S. Cl. .................................... 106/282; 428/378
[58] Field of Search ................ 106/282; 428/489, 491, 428/393, 392, 378, 404, 406, 143

[56] References Cited

U.S. PATENT DOCUMENTS

| | | | |
|---|---|---|---|
| 2,023,675 | 12/1935 | Fisher | 106/282 |
| 2,233,433 | 3/1941 | Smith | 428/378 |
| 3,216,888 | 11/1965 | Cacosoa | 106/282 |
| 4,278,470 | 7/1981 | Marzocchi et al. | 106/281 R |
| 4,358,320 | 11/1982 | Marzocchi et al. | 106/282 |
| 4,613,376 | 9/1986 | Nilsson et al. | 106/282 |

FOREIGN PATENT DOCUMENTS

| | | |
|---|---|---|
| 19147/67 | 9/1968 | Australia . |
| 1720053 | 5/1971 | Fed. Rep. of Germany . |
| 1936922 | 2/1973 | Fed. Rep. of Germany ...... 106/282 |
| 1010280 | 6/1962 | France . |
| 1016610 | 6/1966 | United Kingdom . |

OTHER PUBLICATIONS

SU 1154299, "Dialog Abstracts" (7/5/85) Bituminous Compositions Vatazhniko et al.
"Additives For Plastics", vol. 1, Raymond B. Seymour (Ed.), Academic Press, Inc. (New York), pp. 32, 35, 36, 40, 42 and 75 (1982).
Article entitled "Bitumen Und Asphalt" by Dr. Ing. Wilfrid Fuhrmann published in *Vierte Neubearbeitete Auflage*, 1969, pp. 97–99.

Primary Examiner—William R. Dixon, Jr.
Assistant Examiner—Paul Marcantoni
Attorney, Agent, or Firm—Kramer, Brufsky & Cifelli

[57] ABSTRACT

A granulate for introducing a fibrous filler material into a liquid bitumen mass by adding said granulate to said liquid bitumen mass is provided, said granulate comprising: fibers of said fibrous filler material, said fibers coated and agglomerated into granulates by a binding agent, said binding agent initially binding said fibers when introduced into said bitumen and thereafter losing its binding effect in said liquid bitumen when exposed to heat or the presence of a solvent incorporated in the liquid bitumen thereby effectuating a complete dissolution of said granulate and homogeneous distribution of said fibers throughout said liquid bitumen mass.

45 Claims, No Drawings

FIBER-FILLED GRANULES

The invention relates to a granulate comprising fibrous fillers, in particular for introducing the fibrous fillers into bitumen masses, as well as a method for manufacturing the granulate comprising the fibrous fillers. In the following, the term bitumen is to be understood as all bituminous substances, including bitumen and possibly polymer-modified bitumen and/or tar and/or pitch, as well.

The invention relates in addition to a method for manufacturing bitumen masses comprising bitumen stabilized with fibrous fillers.

It is known to add fibrous filler material to bitumen masses in order to influence the flow properties of the bitumen masses such that they do not have such a strong tendency to flow, i.e. the fibrous fillers have a thixotropic effect in the bitumen. This has, for example, the advantage that a bitumen mass can be applied to a vertical wall in the form of a coating mass as a thicker layer and does not run off so quickly. When the bitumen mass is used on a roofing felt cover it is able to withstand the sun's radiation better when it is stabilized with fibrous fillers since the bitumen then has less ability to flow.

A further example for a bitumen mass is an asphalt mixture used in road building. The amount of bitumen contained in this asphalt mixture can be substantially increased when the bitumen mass is stabilized with fibrous fillers, without the mixture separating into its parts during transport or when applied to the road foundation.

In the known methods for manufacturing bitumen masses the fibrous fillers are very often placed in a mixer, possibly with aggregates, before the bitumen is added and preliminarily mixed. The bitumen is added subsequently.

Problems are, however, generally incurred with this method as the fibrous fillers are not uniformly distributed in the bitumen mass. These problems could be eliminated by using very short fibrous fillers but these have the disadvantage that their thixotropic effect is considerably less than that of long fibrous fillers which, for their part however, tend to agglomerate and combine like cotton-wool balls very easily. It is, therefore, only with difficulty that these fibrous fillers, which are preferred because of their strong thixotropic effect, can be worked uniformly into the bitumen masses.

A mixture of sand or very fine stone chippings with bitumen is often required, for example, for repairing road surfaces and top layer surfaces. Fibrous fillers which are, in particular, long and have the tendency to combine like cotton-wool balls, are very difficult to work into such a fine mineral granule using customary mixing machines and so defective mixtures often occur.

A further difficulty is the problem that a large number of bitumen masses have to be manufactured within a very short period, e.g. the mixing process for a bituminous road surface must be completed within mixing times of generally a few seconds. This means that the difficulties encountered when mixing in the long fibrous fillers which tend to agglomerate and combine like cotton-wool balls will be aggravated further and so the fibrous fillers are not distributed sufficiently uniformly in the material to be mixed. They therefore lead to "nesting" and, consequently, to defective mixtures.

The object underlying the invention is therefore to improve a method of the generic type such that the fibrous fillers can be easily and uniformly distributed throughout the bitumen.

This object is accomplished in accordance with the invention in that for manufacture of the bitumen masses the fibrous fillers are introduced into the fluid bitumen by adding a granulate which comprises the fibrous fillers and which dissolves in the fluid bitumen.

This method has the great advantage that, in contrast to the fibrous fillers previously added in a loose or pressed form, the addition of fibrous fillers in granulated form already results in a coarse distribution of the fibrous fillers in the fluid bitumen which is followed by fine distribution by means of the granulate which dissolves in the fluid bitumen. As a result of the granulate dissolving in the fluid bitumen, the individual fibrous fillers from a granulate substance are immediately picked up by and distributed throughout the bitumen surrounding the fillers. This means that the danger of cellulose fiber bundles being formed, and with it the risk of defective mixtures, can be more or less ruled out.

A further, considerable advantage for performance of the method is to be seen in the fact that handling of the cellulose fibers during admixing is substantially simplified due to use of the granulate since this can be conveyed and quantatively regulated in a simple manner due to its good flow properties whereas the handling of loose or even pressed fibrous fillers which tend to agglomerate and combine like cotton-wool balls is very difficult with conventional conveyor means.

When asbestos fibers are used as fibrous fillers the invention has the additional advantage that for manufacture of the bitumen masses, e.g. at a building site, no open and uncombined asbestos fibers have to be handled, which would be hazardous in view of the detrimental effects of asbestos fibers to health, but that the asbestos fibers are mixed in a form which is unharmful to health, namely bound in a granulate.

A further object of the invention is to create a granulate comprising fibrous fillers, in particular for introducing the fibrous fillers into bitumen masses.

This object is accomplished in accordance with the invention by a granulate which comprises fibrous fillers and a binding agent which loses its binding effect in fluid bitumen.

Fluid bitumen is to be understood as a bitumen which is given the ability to flow either by heating or by the addition of suitable solvents. The binding agent should therefore be designed such that it loses its binding effect either at a high temperature or due to the presence of solvent at a low temperature.

As a result of a binding agent selected in this manner the granulate is composed such that it dissolves in fluid bitumen and thereby releases the fibrous fillers so that they can be evenly distributed throughout the fluid bitumen.

In a particularly favourable composition of the inventive granulate, the proportion by weight of the binding agent is at least approximately 1/5 of the total weight of the granulate.

It is, however, more advantageous for the proportion by weight of the binding agent to be higher, in particular at least ¼ or ⅓ of the total weight or even half the total weight of the granulate. Such a high proportion of binding agent has the advantage that the fibrous fillers are subject to considerably less wear and strain during manufacture of the granulate as the binding agent itself displays a lubricating effect, embeds the fibrous fillers in itself and thereby reduces the mechanical stress on the fibrous fillers.

Moreover, the fibers are carried along with the melting binding agent, in particular when the proportion of the binding agent is high, and so the fibers will certainly be very finely distributed throughout the material to be mixed.

For the same reason, the proportion by weight of the fibrous fillers in an advantageous inventive embodiment should be at the most approximately 4/5 of the total weight of the granulate. It is, however, more advantageous for the proportion by weight of the fibrous fillers to be approximately ⅔ or ⅗ or, even better, approximately half the total weight.

The details concerning the minimum proportions of binding agent and the maximum proportions of fibrous fillers also cover granulates in which the proportion of binding agent outweighs the proportion of fibrous fillers. It may be conceivable for special applications to provide, for example, a granulate having approximately 10% by weight of fibrous fillers and 90% by weight of binding agent.

It has proven particularly advantageous for the proportions by weight of the binding agent and the fibrous fillers to be approximately equal.

The inventive granulates described above can be composed exclusively of binding agent and fibrous fillers, with the binding agent and fibrous fillers being for the most part evenly mixed with one another. However, the proportions by weight specified above should not rule out the addition of further aggregates to the inventive granulate. For example, these may be aggregates which protect the fibrous fillers to an even greater extent from mechanical influences during manufacture of the granulate. Aggregates are, however, also conceivable which improve the dissolution of the granulate in the fluid bitumen and, in particular, the separation of the individual fibers from one another or even those aggregates which are important for the later bitumen mass so that the addition of these aggregates to the granulate already dispenses with a later, separate addition of these aggregates.

As already described at the beginning, the fibrous fillers used for the inventive granulate should be as long as possible to generate a thixotropic effect which is as good as possible. In this respect, it has proven favourable for the length of the fibrous fillers to be in the region of approximately 0.01 to 6 mm. It is, however, more advantageous for the fibrous fillers to have an average length in the region of approximately 0.5 to 3 mm. Within the scope of a particularly preferred embodiment of the inventive granulate, the length of the fibrous fillers used was in the region of approximately 0.5 to 3 mm.

With respect to the binding agent, a number of possibilities are conceivable. For example, a binding agent which is intended to lose its binding effect in bitumen made fluid by heating can consist of a material having a melting point below that of the bitumen. On the other hand, it is also possible, for a binding agent which is intended to lose its binding effect in bitumen kept fluid by means of a solvent, to use a material which also dissolves in the respective solvent. Since there could be the risk of foreign substances used as binding agent possibly having a disturbing effect in the bitumen mass, it is advantageous for the binding agent to comprise bitumen. However, further additives, which serve to improve the properties of the binding agent, can be included in this binding agent.

The simplest and, above all, cheapest form of the binding agent is for the binding agent to be bitumen alone.

Nothing more detailed has been said in the embodiments of the inventive granulate discussed so far concerning the fibrous fillers as such. The fibrous fillers can, theoretically, be any optional fibers which are suitable as thixotropic means, e.g. asbetos as well. From the point of view of costs and also in view of the properties of asbestos which are detrimental to health, it is particularly advantageous for the fibrous fillers to be manufactured from plant matter, in particular when the fibrous fillers are manufactured from cotton and/or linters and/or wood.

Practical tests have shown that a good thixotropic effect and a good stability of the fibrous fillers result when the fibrous fillers comprise cellulose fibers. In this respect, it is most advantageous for the fibrous fillers to consist exclusively of cellulose fibers.

The best thixotropic properties are obtained when the cellulose fibers are milled to form fine fibrils.

Finally, the object of the invention is to create a method for manufacturing a granulate comprising fibrous fillers.

This object is accomplished in accordance with the invention, for a method for manufacturing a granulate comprising fibrous fillers, in that binding agent and fibrous fillers having the properties and proportions by weight described above are mixed with one another and granulated.

It has proven particularly appropriate for the mixture of binding agent and fibrous fillers to be granulated by means of extrusion.

A method is also advantageous, in which the mixture of fibrous fillers and binding agent is granulated by rolling it out into pats which are subsequently cut up.

Within the scope of the present invention bitumen is, as explained at the outset, to be understood as all bituminous products. For reasons of cost and for reasons of its extensive distribution it is particularly advantageous to use the petroleum product bitumen or its improved products.

Additional features and advantages of the inventive method as well as of the inventive granulate are the subject matter of the embodiment described in the following.

For manufacture of the inventive granulate, bitumen and cellulose fibers, which are milled to form fine fibrils and have a length of between 0.5 and 3 mm, are mixed with one another in equal proportions by weight for such a time until a substantially even distribution of the components is attained and then granulated in the known way by using an extruder.

Alternatively, granulation can be carried out by the mixture of cellulose fibers and bitumen being rolled out by means of a crushing roller to form pats which can then be cut by subsequent cutting machines to form granulates of any optional size.

This granulate consisting of bitumen and cellulose fibers has the advantage that it can be very easily packed and transported. In addition, this granulate can be fed via an automatic transport and metering apparatus during manufacture of, for example, asphalt as it has excellent flow properties.

During manufacture of asphalt for road surfaces the mineral substances are customarily added in the mixer.

In contrast to the previous methods, a preliminary mixing of the mineral substances with the cellulose which is subsequently added is superfluous since the addition of the inventive granulate facilitates an immediate addition of binding agents, i.e. bitumen, as well. This means that the mixing process can be carried out considerably more quickly than in the previous modes of operation.

The inventive granulate bodies dissolve in the hot fluid bitumen in that the bitumen contained therein as binding agent also becomes fluid and when it melts or flows away it takes or draws with it the individual cellulose fibers embedded in the binding agent bitumen so that these cellulose fibers no longer have any opportunity to agglomerate or combine with one another like cotton-wool balls.

For this reason, the risk of defective mixtures due to uneven distribution of cellulose fibers in the bitumen can be ruled out.

I claim:

1. A granulate for introducing a fibrous filler material into a liquid bitumen mass by adding said granulate to said liquid bitumen mass, said granulate comprising: fibers of said fibrous filler material, said fibers coated and agglomerated into granulates by a binding agent, said binding agent initially binding said fibers when introduced into said bitumen and thereafter losing its binding effect in said liquid bitumen when exposed to heat or the presence of a solvent incorporated in the liquid bitumen thereby effectuating a complete dissolution of said granulate and homogeneous distribution of said fibers throughout said liquid bitumen mass.

2. Granulate as defined in claim 1, characterized in that the proportion by weight of the binding agent is at least approximately 1/5 of the total weight of the granulate.

3. Granulate as defined in claim 2, characterized in that the porportion by weight of the binding agent is at least approximately ¼ of the total weight of the granulate.

4. Granulate as defined in claim 3, characterized in that the proportion by weight of the binding agent is at least approximately ⅓ of the total weight of the granulate.

5. Granulate as defined in claim 4, characterized in that the proportion by weight of the binding agent is at least approximately half the total weight of the granulate.

6. Granulate as defined in claim 1, characterized in that the proportion by weight of the fibrous fillers is at the most approximately 4/5 of the total weight of the granulate.

7. Granulate as defined in claim 6, characterized in that the proportion by weight of the fibrous fillers is at the most approximately ¾ of the total weight of the granulate.

8. Granulate as defined in claim 7, characterized in that the proportion by weight of the fibrous fillers is at the most approximately ⅔ of the total weight of the granulate.

9. Granulate as defined in claim 8, characterized in that the proportion by weight of the fibrous fillers is at the most approximately half the total weight of the granulate.

10. Granulate as defined in claim 1, characterized in that the proportions by weight of the binding agent and the fibrous fillers are approximately equal.

11. Granulate as defined in claim 1, characterized in that the length of the fibrous fillers is in the region of approximately 0.01 to 6 mm.

12. Granulate as defined in claim 11, characterized in that the fibrous fillers have an average length in the region of approximately 0.5 to 3 mm.

13. Granulate as defined in claim 11, characterized in that the length of the fibrous fillers is in the region of approximately 0.5 to 3 mm.

14. Granulate as defined in claim 1, characterized in that the binding agent comprises bitumen.

15. Granulate as defined in claim 14, characterized in that the binding agent is bitumen.

16. Granulate as defined in claim 1, characterized in that the fibrous fillers are manufactured from plant matter.

17. Granulate as defined in claim 16, characterized in that the fibrous fillers are manufactured from cotton.

18. Granulate as defined in claim 16, characterized in that the fibrous fillers are manufactured from linters.

19. Granulate as defined in claim 16, characterized in that the fibrous fillers are manufactured from wood.

20. Granulate as defined in claim 1, characterized in that the fibrous fillers comprise cellulose fibers.

21. Granulate as defined in claim 20, characterized in that the fibrous fillers are cellulose fibers.

22. Granulate as defined in claim 21, characterized in that the cellulose fibers are milled to form fine fibrils.

23. Method for manufacturing a bitumen mass stabilized with homogeneously distributed fibrous filler material which comprises:
(a) coating fibers of said fibrous filler material with a binding agent, said binding agent exhibiting a binding effect on said fibers when introduced into liquified bitumen and thereafter losing its binding effect in said liquified bitumen,
(b) agglomerating said coated fibers into granulates,
(c) liquifying bitumen,
(d) admixing said granulates and said liquified bitumen, whereupon said granulates dissolve completely for producing a homogeneous distribution of said fibers throughout said liquified bitumen mass.

24. Method for manufacturing a granulate containing fibrous fillers, characterized in that binding agent and fibrous fillers as defined in claim 1 are mixed with one another and granulated.

25. Method as defined in claim 24, characterized in that the mixture of binding agent and fibrous fillers is granulated by means of extrusion.

26. A method for manufacturing stone chip-free granulates for introducing a fibrous filler material into a bitumen mass and generating a homogeneous distribution of said fibrous filler material therein by adding said granulates to said liquid bitumen mass which comprises: coating fibers of said fibrous filler material with a binding agent to produce granulates, said binding agent exhibiting a binding effect on said fibers when initially introduced into said liquified bitumen and losing its binding effect in said liquified bitumen due to the presence of heat or a solvent incorporated in said bitumen mass; and agglomerating said coated fibers into granulates.

27. Method for manufacturing a bitumen mass which comprises: (a) coating fibers of a fibrous filler material with a binding agent to produce granulates, said binding agent exhibiting a binding effect on said fibers when initially introduced into said liquified bitumen and thereafter losing its binding effect in said liquified bitumen; (b) agglomerating said coated fibers into granulates; (c) liquifying bitumen; (d) admixing said granulates and said liquified bitumen, whereupon said granulates dissolve completely in said liquified bitumen thereby producing a homogeneous distribution of said fibers throughout said liquified bitumen mass.

28. Method for manufacturing a bitumen mass comprising fine stone chip for road building which comprises: (a) coating fibers of a fibrous filler material with a binding agent to produce granulates, said binding agent exhibiting a binding effect on said fibers when introduced into liquified bitumen and thereafter losing its binding effect in said liquified bitumen; (b) liquifying bitumen; (c) admixing said granulates, said fine stone chip and said liquified bitumen, dissolving said granulates completely in said liquified bitumen such that said granulates, stone chip and liquified bitumen produce a liquified bituminous mass containing a homogeneous distribution of said fibers throughout said liquified bitumen mass and a distribution of said stone chip in said homogeneous mass of liquified bitumen and fibers.

29. A bitumen mass according to the method of claim 28.

30. A granulate for introducing a fibrous filler material into a liquid bitumen mass by adding said granulate to said liquid bitumen mass, said granulate comprising fibers of said fibrous filler material, said fibers being coated and agglomerated into granulates by a binding agent, said binding agent having a binding effect on said fibers out of said liquid bitumen and losing said binding effect in said liquid bitumen to thereby effect a complete dissolution of said granulates in said liquid bitumen for achieving a homogeneous distribution of said fibers in said liquid bitumen mass.

31. Method for manufacturing a bitumen mass, said bitumen mass including bitumen stabilized with homogeneously distributed fibrous filler material, said method comprising: producing a granulate by coating fibers of said fibrous filler material with a binding agent, said binding agent having a binding effect on said fibers out of liquid bitumen and losing said binding effect in said liquid bitumen, and agglomerating said coated fibers forming said granulates; liquifying bitumen; admixing said granulates and said liquified bitumen and dissolving said granulates completely in said bitumen mass for producing a homogeneous distribution of said fibers in said liquified bitumen mass.

32. A bitumen mass according to the method of claim 29.

33. A bitumen mass according to the method of claim 32.

34. A granulated bitumen filler material for introducing a fibrous filler material into a liquid bitumen mass by adding said granulate to said liquid bitumen mass, said granulate comprising fibers of said fibrous filler material, said fibers being coated and agglomerated into granulates by a binding agent, said binding agent having a binding effect on said fibers out of said liquid bitumen and losing said binding effect in said liquid bitumen to thereby effect a degranulation and dissolution of said granulate and a homogeneous distribution of said fibers in said liquid bitumen mass.

35. Method for manufacturing a bitumen mass, said bitumen mass including bitumen stabilized with homogeneously distributed fibrous filler material, said method comprising:

producing a stone chip-free granulates by coating fibers of said fibrous filler material with a binding agent, said binding agent having a binding effect on said fibers out of liquid bitumen and losing said binding effect in said liquid bitumen, and agglomerating said coated fibers forming said granulates;

liquifying bitumen;

admixing said granulates and said liquified bitumen and completely dissolving said granulates in said bitumen mass for producing a homogeneous distribution of said fibers in said liquified bitumen mass.

36. A bitumen mass according to the method of claim 35.

37. A granulate for introducing a fibrous filler material into a liquid bitumen mass by adding said granulate to said liquid bitumen mass, said granulate being free of stone chips and comprising fibers of said fibrous filler material, said fibers being coated and agglomerated into granulates by a binding agent, said binding agent having a binding effect on said fibers out of said liquid bitumen and losing said binding effect in said liquid bitumen to thereby effect a degranulation of said granulates and a homogeneous distribution of said fibers in said liquid bitumen.

38. Method for manufacturing a bitumen mass comprising stone chips, said bitumen mass including bitumen stabilized with homogeneously distributed fibrous filler material, said method comprising:

producing a stone chip-free granulate by coating fibers of said fibrous filler material with a binding agent, said binding agent having a binding effect on said fibers out of said liquid bitumen and losing said binding effect in said liquid bitumen, and agglomerating said coated fibers forming said granulates;

liquifying bitumen;

admixing said stone chips, said granulates and said liquified bitumen and dissolving said granulates for producing a homogeneous distribution of said fibers in said liquified bitumen.

39. A bitumen mass according to the method of claim 38.

40. A granulate for introducing a non-asbestos fibrous filler material into a liquid bitumen mass by adding said granulate to said liquid bitumen mass, said granulate comprising fibers of said non-asbestos fibrous filler material, said fibers being coated and agglomerated into granulates by a binding agent, said binding agent having a binding effect on said fibers out of said liquid bitumen and losing said binding effect in said liquid bitumen to thereby effect a degranulation of said granulate and a complete dissolution of said granulate in said liquid bitumen for achieving a homogeneous distribution of said fibers in said liquid bitumen.

41. Method for manufacturing a bitumen mass, said bitumen mass including bitumen stabilized with homogeneously distributed non-asbestos fibrous filler material, said method comprising:

producing a granulate by coating fibers of said fibrous filler material with a binding agent, said binding agent having a binding effect on said fibers out of said liquid bitumen and losing said binding effect in said liquid bitumen, and agglomerating said coated fibers forming said granulates;

liquifying bitumen;

admixing said granulates and said liquified bitumen and dissolving said granulates completely in said bitumen mass for producing a homogeneous distribution of said fibers in said liquified bitumen.

42. A bitumen mass according to the method of claim 41.

43. A granulate for introducing a fibrous cellulosic filler material into a liquid bitumen mass by adding said granulate to said liquid bitumen mass, said granulate comprising cellulosic fibers of said fibrous filler material, said fibers being coated and agglomerated into granulates by a binding agent, said binding agent having a binding effect on said fibers out of said liquid bitumen and losing said binding effect in said liquid bitumen to thereby effect a degranulation of said granulate and a complete dissolution of said granulate in said liquid bitumen for achieving a homogeneous distribution of said fibers in said liquid bitumen.

44. Method for manufacturing a bitumen mass, said bitumen mass including bitumen stabilized with homogeneously distributed fibrous cellulosic filler material, said method comprising: producing a granulate by coating cellulosic fibers of said fibrous filler material with a binding agent, said binding agent having a binding effect on said fibers out of said liquid bitumen and losing said binding effect in said liquid bitumen, and agglomerating said coated fibers forming said granulates;

liquifying bitumen;

admixing said granulates and said liquified bitumen and completely dissolving said granulates in said bitumen mass for producing a homogeneous distribution of said fibers in said liquified bitumen.

45. A bitumen mass according to the method of claim 44.

* * * * *